(12) United States Patent
Moore, Jr. et al.

(10) Patent No.: US 7,035,270 B2
(45) Date of Patent: Apr. 25, 2006

(54) HOME NETWORKING GATEWAY

(75) Inventors: Richard Moore, Jr., Harleysville, PA (US); William H. Blum, Harleysville, PA (US)

(73) Assignee: General Instrument Corporation, Horsham, PA (US)

( * ) Notice: Subject to any disclaimer, the term of this patent is extended or adjusted under 35 U.S.C. 154(b) by 1016 days.

(21) Appl. No.: 09/752,570

(22) Filed: Dec. 29, 2000

(65) Prior Publication Data
US 2002/0021465 A1   Feb. 21, 2002

Related U.S. Application Data

(60) Provisional application No. 60/173,700, filed on Dec. 30, 1999.

(51) Int. Cl.
*H04L 12/28* (2006.01)

(52) U.S. Cl. .................................. 370/401; 370/466

(58) Field of Classification Search ............... 370/351, 370/352, 353, 468, 401, 474, 490, 389, 390, 370/400, 402, 403, 404, 465, 466, 467, 469, 370/254, 256; 725/109, 111, 105, 106, 114, 725/123; 709/141, 220, 213
See application file for complete search history.

(56) References Cited

U.S. PATENT DOCUMENTS

| | | | |
|---|---|---|---|
| 5,896,382 A | 4/1999 | Davis et al. | |
| 6,377,987 B1 * | 4/2002 | Kracht | 709/220 |
| 6,421,358 B1 * | 7/2002 | Stimmel et al. | 370/489 |
| 6,452,923 B1 * | 9/2002 | Gerszberg et al. | 370/352 |
| 6,493,874 B1 * | 12/2002 | Humpleman | 725/78 |
| 6,526,581 B1 * | 2/2003 | Edson | 725/74 |
| 6,546,017 B1 * | 4/2003 | Khaunte | 370/412 |
| 6,553,568 B1 * | 4/2003 | Fijolek et al. | 725/111 |
| 6,618,387 B1 * | 9/2003 | Liu et al. | 370/401 |
| 6,622,304 B1 * | 9/2003 | Carhart | 725/74 |
| 6,697,864 B1 * | 2/2004 | Demirtjis et al. | 709/229 |
| 6,732,315 B1 * | 5/2004 | Yagil et al. | 714/755 |
| 6,735,293 B1 * | 5/2004 | Doherty et al. | 379/201.12 |

(Continued)

FOREIGN PATENT DOCUMENTS

| WO | WO 00/76130 A1 | 12/2000 |
|---|---|---|
| WO | WO 01/01632 A2 | 1/2001 |

(Continued)

OTHER PUBLICATIONS

Publication "Datalink Push2Tset tool" discloses software that includes discovery of a home network elements.*

(Continued)

*Primary Examiner*—Hassan Kizou
*Assistant Examiner*—Ricardo Pizarro
(74) *Attorney, Agent, or Firm*—Benjamin D. Driscoll

(57) ABSTRACT

A home networking gateway provides an interface between an HFC network and an in-home network. Full voice and data connection between the HFC network and each device in the in-home network is provided through the interface. A translator included in the home networking gateway is utilized to provide a mapping between the communication protocols used in the in-home network and the protocols used in the HFC network, eliminating the need for the in-home network to be dependent upon the HFC-specific protocols.

10 Claims, 10 Drawing Sheets

U.S. PATENT DOCUMENTS

| | | | |
|---|---|---|---|
| 6,747,996 B1 * | 6/2004 | Holloway et al. | 370/503 |
| 6,748,080 B1 * | 6/2004 | Russ et al. | 380/239 |
| 6,762,690 B1 * | 7/2004 | Diehl et al. | 340/825.25 |
| 6,775,244 B1 * | 8/2004 | Hattig | 370/257 |
| 6,792,323 B1 * | 9/2004 | Krzyzanowski et al. | 700/90 |

FOREIGN PATENT DOCUMENTS

| | | |
|---|---|---|
| WO | WO 01/01632 A3 | 1/2001 |

OTHER PUBLICATIONS

Publication "Network inventory tool" discloses an inventory tool that discovers, recognizes and reports on the softwa and hardware of a network.*

Ferrero, Umberto: "Broadband Optical Access Networks: Cooperative Work Among European PNOs"; 22nd European Conference on Optical Communications; 1996; XP-002185187.

* cited by examiner

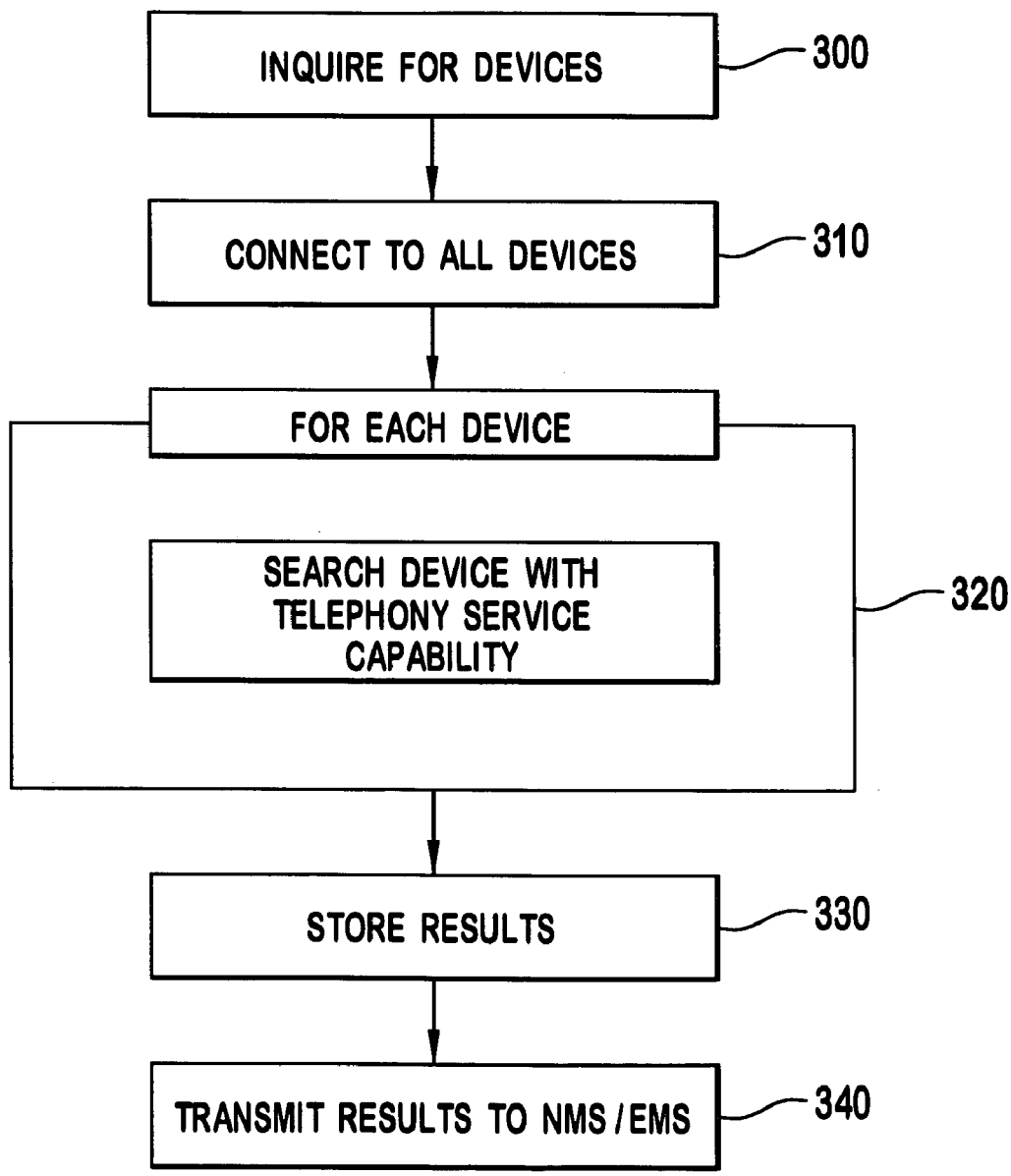

HOME NETWORKING GATEWAY

CROSS-REFERENCE TO RELATED APPLICATION

This application claims the priority of Provisional Application No. 60/173,700, filed Dec. 30, 1999.

TECHNICAL FIELD

The present invention relates to a home networking gateway and, more particularly, to a gateway arrangement for providing internetworking functionality between an external HFC network and a network of devices within a "home" or other similar environment.

BACKGROUND OF THE INVENTION

Hybrid fiber coaxial (HFC) networks are rapidly evolving to support a variety of telecommunications services in addition to traditional broadcast-type video services. In particular, HFC networks are being utilized to provide data services, including high speed Internet access. Cable network operators are expected to be providing medium to high penetration rate telephony services in the near future.

Telecommunications services, such as plain old telephone service (POTS), can be provided through the use of a unit located on the side of a home, or in a centralized location in the residence (or business). This unit, which forms the interface between the HFC network and the telephone-based customer premise equipment (CPE) can be referred to as a "communications gateway", or CG. The CG contains various line cards that provide an interface between the HFC network and traditional telephones, for example, using a "POTS card" located in the CG. The CG transmits and receives data over the HFC network using a particular protocol, which in a preferred embodiment is the Data Over Cable Service Interface Specification (DOCSIS), using the Media Gateway Control Protocol (MGCP) as the signaling protocol for telephony applications.

With a POTS card in place, an interface to a twisted-wire pair is provided and telephones in the residence can be used in a conventional manner, with all of the phones connected to a single twisted-wire pair connected in a bus configuration to the phone outlets throughout the building. Alternatively, "home run" wiring may be utilized, with point-to-point connections being established between a centralized location and a particular telephone outlet or set of outlets. The advantage of home run wiring is that several phone lines can easily be supported in the home, and phones in one area can be assigned one telephone number, distinct from other numbers used for phones in other areas. Multiple POTS cards are typically used to support multiple telephone lines.

At the present time, however, most homes and small businesses do not have a "home run" wiring installation, but instead use the simple bus structure that connects to the telephone network at a defined demarcation point. In some instances, a customer may desire to have a low cost basic telephone line from the local telephone company, but will also want to have additional lines supplied by an HFC network operator. In some homes, additional twisted-wire pairs will not be available. These limitations necessitate other means of interconnecting telephones or other data/telecommunications devices with the CG. In other circumstances, a twisted wire pair may be available, but the services to be provided may go beyond a single POTS line.

Since the in-home wiring may not be optimal in terms of architecture, and may also be carrying a POTS signal supplied by a telephone company, it is necessary for the HFC network operator to consider the use of alternative types of in-home communications. These types of communications can include in-home wiring networks, the provision of data over the existing telephone line (above the POTS spectrum), or using the in-home electrical power network.

FIG. 1 is a diagram of an exemplary conventional network architecture utilizing a communications gateway (CG) between an HFC network and a residence. As shown, CG 10 is in communication with a Cable Modem Termination System (CMTS) 12 over an HFC network 14. CMTS 12 is in further communication with a call management system (CMS) 16 that communicates with both a public switched telephone network (PSTN) 18 and an IP network 20. As illustrated in FIG. 1, CG 10 communicates on the residence side with a plurality of devices 22 via an in-home network 24. Use of in-home networking protocols will allow for new services to be supported from CG 10, and will allow for the use of existing CPE (e.g., standard telephones) to be used in implementing at least some of these new services. However, since the HFC network uses a specific protocol, it is likely to be distinct from and incompatible with in-home networking protocols, making difficult any communication between the HFC network and the home.

SUMMARY OF THE INVENTION

The need remaining in the art is addressed by the present invention, which relates to a home networking gateway and, more particularly, to a gateway arrangement for providing internetworking functionality between an external HFC network and a network of devices within a "home" or other similar environment.

In accordance with the present invention, a home networking gateway (HNG) is used as an interface between an HFC network and the home devices and includes the capability of "discovering" the various devices attached to the in-home network. An HNG in accordance with the present invention is also used to provide for allocation of resources over the in-home network. The HNG, in combination with a translator function located in the application layer of the HNG, provides compatibility between the HFC network protocols and a variety of in-home networking protocols.

In one embodiment, the HNG as configured in accordance with the present invention, discovers in-home devices and their associated service requirements, including the type of information flow (i.e., synchronous or asynchronous) and the bandwidth consumption. For example, in the case of synchronous flow (such as transmission), bandwidth can be pre-allocated for that device.

An advantage of using a home networking gateway (HNG) is that it enables the exchange of key networking parameters over the HFC network, where the parameters may originate in many diverse in-home networks. In particular, the HNG allows for devices in the home to communicate over the HFC network without requiring them to have specific knowledge of and support for the HFC network protocols.

Various other embodiments and advantages of the present invention will become apparent during the course of the following discussion, and by reference to the accompanying drawings.

BRIEF DESCRIPTION OF THE DRAWINGS

Referring now to the drawings,

FIG. 10 contains a flowchart illustrating an exemplary process for discovering Bluetooth devices in an in-home network.

DETAILED DESCRIPTION

Figure 2:
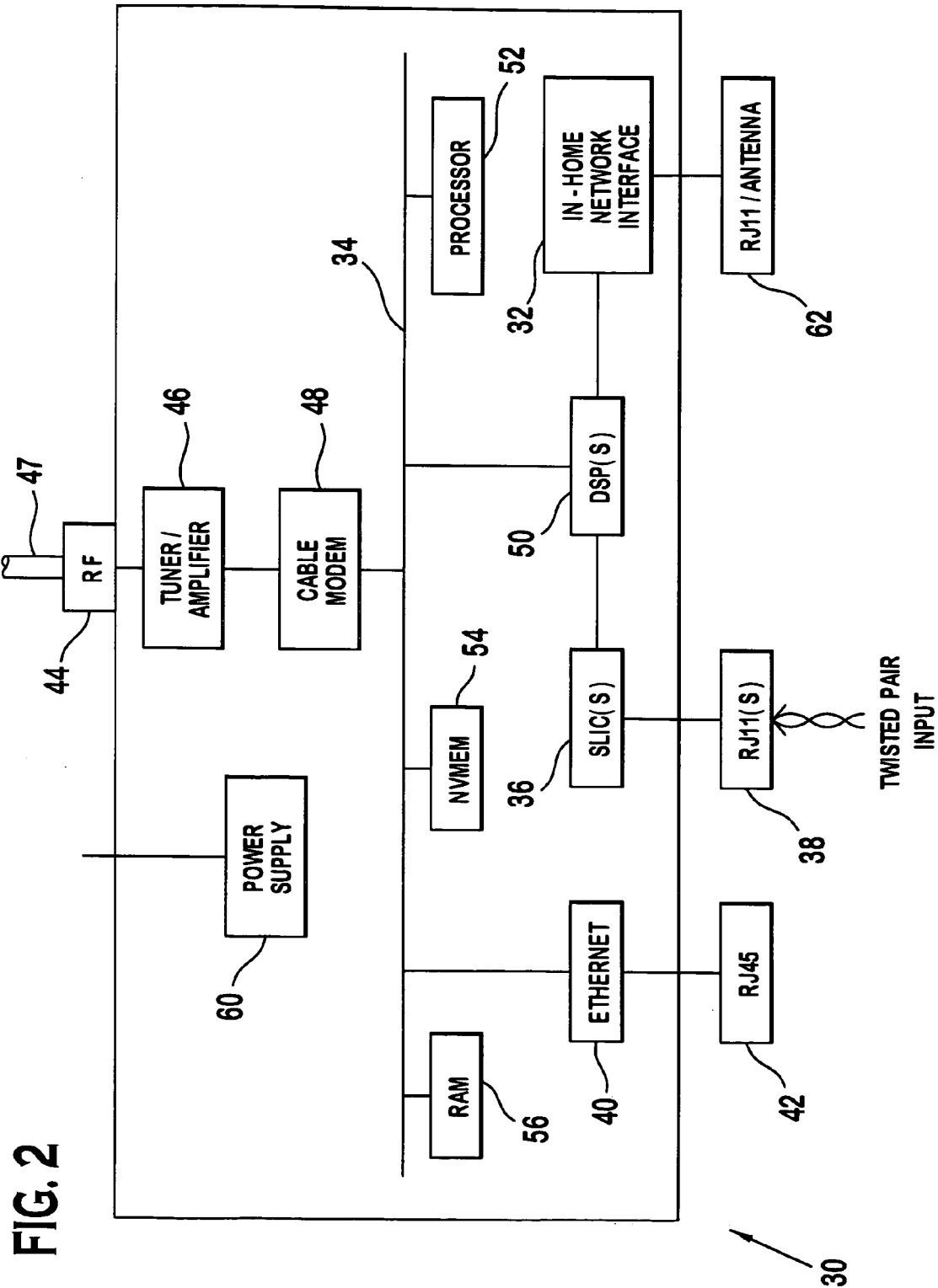
FIG. 2 illustrates, in block diagram form, an exemplary home networking gateway (HNG) formed in accordance with the present invention.

FIG. 2 illustrates an exemplary home networking gateway (HNG) 30 of the present invention, implemented as a communication gateway including an embedded home network interface 32. In this embodiment, HNG 30 contains the appropriate software and hardware to support a particular home network and the delivery of multiple service operator (MSO)-based services to that particular home network. Home network interface 32 can also be in the form of a plug-in card connected to main bus 34 and containing the appropriate physical layer drivers and interface (e.g., antenna, RJ-11 connection, power system connection). Software for supporting the home network can be resident on the card, or contained as part of the software of the communications gateway. Upgrading of the software can be performed via the HFC network, from the NMS/EMS (see FIG. 3).

As shown in FIG. 2, HNG 30 supports telephony services over one or more twisted wire pairs through (one or more) Subscriber Line Interface Circuit (SLIC) cards 36 and RJ-11 interfaces 38. Home networking gateway 30 also supports data services, as shown, through an Ethernet card 40 connected between main bus 34 and an RJ 45 interface 42. In accordance with the present invention, in-home network interface unit 32 is used to support an interface to the in-home devices and is based on any one of the possible in-home protocols, including wireless, twisted wire pair (data over voice), or powerline. Other in-home interfaces, such as the intra-red protocol, may also be supported.

Figure 1:
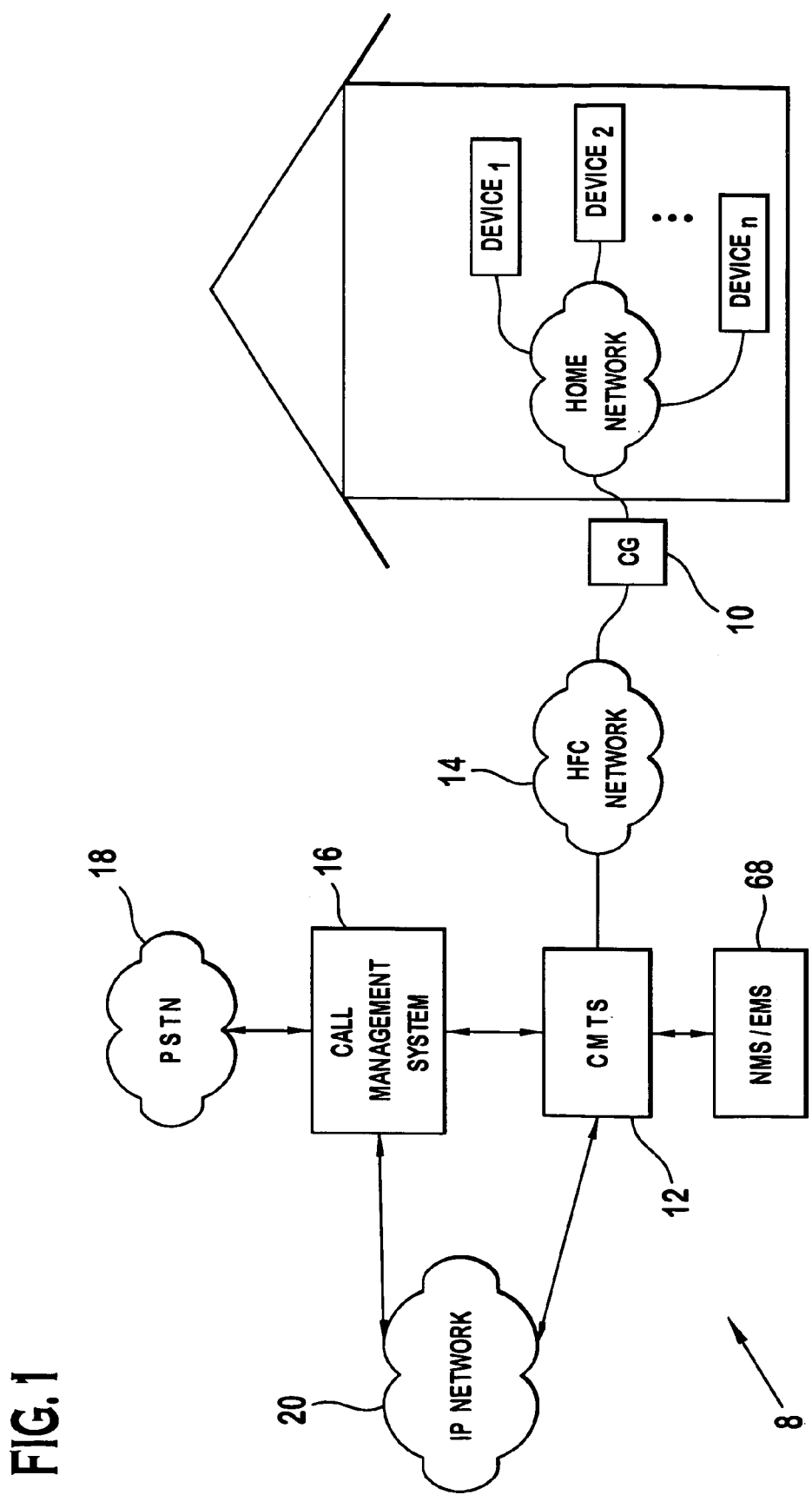
FIG. 1 contains a simplified network architecture of a prior art arrangement for providing communication between a residence and an HFC network.

As illustrated in FIG. 2, an RF connector 44 is utilized to couple an incoming cable 46 to the Multimedia Cable Network System ((MCNS), DOCSIS-based) tuner 46. A cable modem 48 implements the DOCSIS layer that allows for HNG 30 to communication with CMTS 12 (see FIG. 1). HNG 30 also includes a digital signal processor (DSP) 50 to perform voice processing, run a compression algorithm when needed, and perform other signal processing operations. An exemplary subscriber line interface circuit (SLIC) 36 can support up to four separate telephone lines using RJ 11 connectors. A processor 52, a non-volatile memory 54 and RAM 56 also communicate through main bus 34, where bus 34 also interconnects the various other modules within the gateway. In one exemplary embodiment, a R3000 processor offered by Toshiba may be used.

Figure 3:
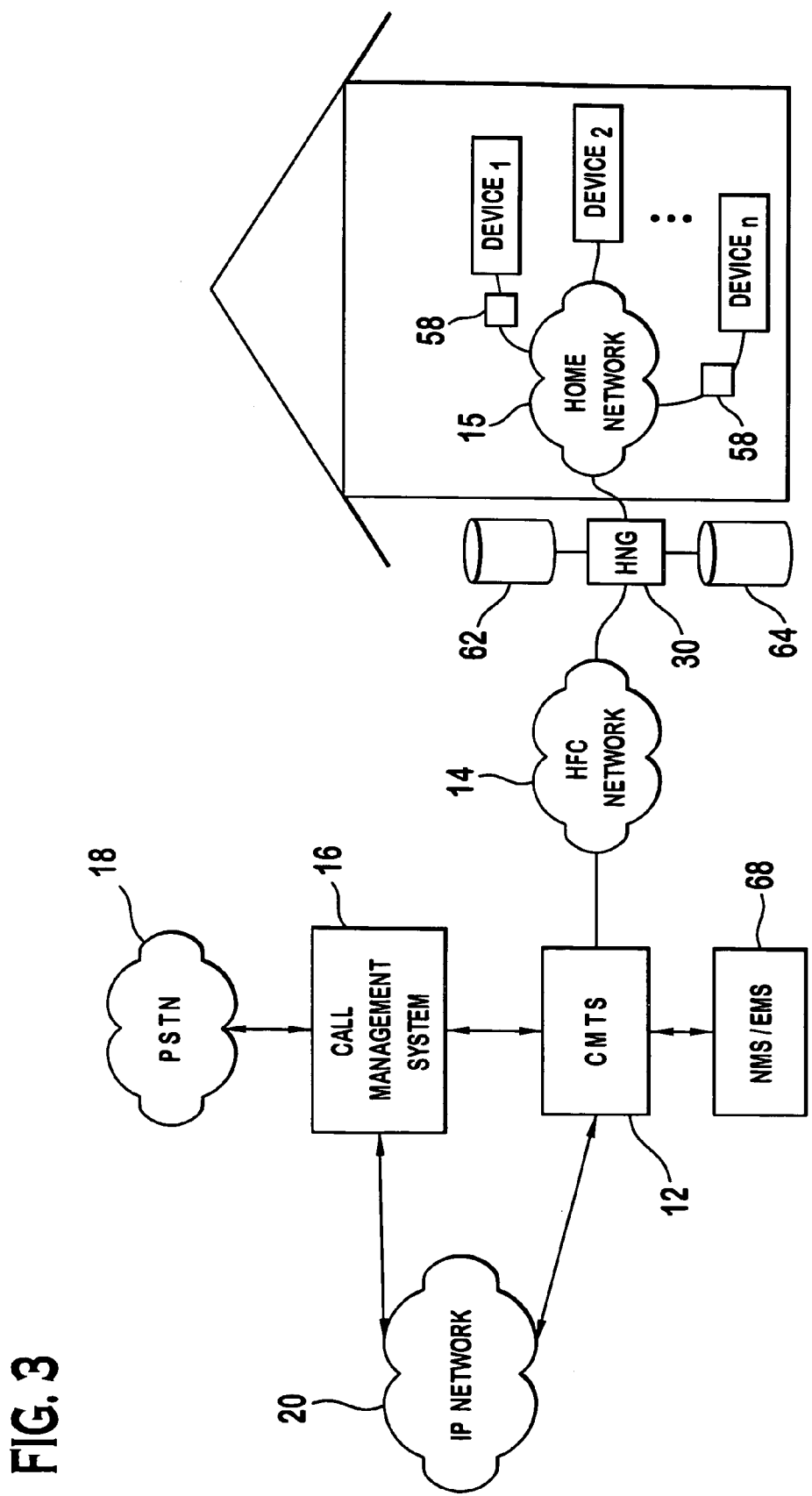
FIG. 3 illustrates an alternative network architecture configuration including dongle interfaces between the communication devices and the home networking gateway.

In accordance with the principles of the present invention, DSP 50 emulates a pulse code modulated (PCM) highway to communicate with SLIC 36 by sending OCM-encoded data signals. SLIC 36 generates analog signals for distribution over the twisted-wire pair telephone wiring (via RJ 11 interconnect 38). In a preferred embodiment, DSP 50, via the PCM highway, communicates with in-home network interface 32 to distribute telephone signals and other signals through the home network. In this embodiment, the conversion functionality (e.g., CODEC) needed to convert the digital signal coming from DSP 50 into an analog telephone signal may be implemented in a remote device defined as a "dongle" (such as dongle 58 of FIG. 3) which interfaces with the telephone device on the other side of the home network as illustrated in FIG. 3. In this application, dongle 58 serves as a remote SLIC and displaces the line card functionality from HNG 30 to dongle 58. This allows a home network to be used to transport a digital telephone signal that is converted back to analog at the dongle. In this particular embodiment, dongle 58 communicates with HFC network 14 through HNG 30 and acts as an extension of both the HFC and HNG into the home. The advantage of such an embodiment is that the active electronics are distributed and are placed in close proximity to the end devices. For telephony applications, this means that the telephone interfaces to the dongle that receives the digital signal from HNG 30 over the specified home network protocol.

In a preferred embodiment of the present invention HNG 30 is powered locally through the customer power network or, alternatively, through the use of a battery 60 (see FIG. 2) placed within HNG 30.

As previously described, the home networking gateway can be provided with an integrated in-home network interface to provide internetworking functions between the HFC network and the home network. In a preferred embodiment, the home network is based on a communication technology defined by the Home Phoneline Network Alliance (Home-PNA) with the home network interface serving as a Home-PNA base station. The HomePNA technology facilitates data communication over existing customer premises telephone wires by multiplexing data carried over Home PNA with voice signals and xDSL signals. The HomePNA technology uses the frequency band above 2 MHz. The connection to the HomePNA network utilizes an RJ 11 port 62 attached to the (in-home) HomePNA network interface 32 (see FIG. 2).

In an alternative embodiment, the home network is formed by using the home electrical power line network. In this embodiment, voice services are delivered through the power network using communication technology overlaid on the power line. A power line network interface is then required to be implemented inside the communication gateway. The interface is also provided with an AC plug port to connect to the power line network.

In yet another embodiment, the home network may utilize the Shared Wireless Access Protocol (SWAP) defined by the HomeRF working group as a basis to distribute voice services to various telephone devices inside the subscriber home. Other services, such as video and data services, can also be provided through the HomeRF SWAP home network. The HomeRF SWAP is designed to carry both voice and data traffic in the 2.4 GHz band using frequency hopping spread spectrum technology The SWAP interface inside the HNG is connected via an antenna 64 to (SWAP-based) in-home network interface 32.

HNG 30 can also support other home network interfaces, including a cordless telephone base station, a PCS base station, or an Infrared Data Association (IrDA) based network interface. Other network interfaces, including the IEEE 1394 (Fire Wire) interface and the "Bluetooth" interface can also be supported by HNG 30.

In general and in accordance with the present invention, HNG 30 includes a translator function within processor 52 that provides the ability to convert the in-home networking protocol-related information to HFC network parameters. These parameters can subsequently be used by the HFC network elements include CMTS 12 and CMS 16. Given that the in-home networking protocols mentioned above do not have knowledge of the specific protocols used within the HFC network, the translator provides the ability to map HFC-specific messages to corresponding in-home network parameters. In the case that there are no messages in the in-home networking protocol which are equivalent to those used in the HFC network, the translator mediates between the two networks to insure that communications are established with the appropriate bandwidth and latency requirements. The translator function, as will be described in detail below, can be a process running at the application layer or, alternatively, it can be implemented as a protocol layer under the application layer and connected to both "legs" of the protocol stack.

The home networking gateway of the present invention allows for the extension of multiple-service operator (MSO)-based services delivered through the HFC network to home devices attached to a home network. While home networking technologies are typically designed for home-based applications such as audio/video distribution, home automation and computer networking, use of a home networking gateway will diversify the applications to include MSO-based services. In particular, MSO-based services includes audio/video entertainment, high-speed data access (e.g., Internet access), voice telephony, video telephony and streaming media. For these services to be widely deployed, cable requirements in terms of network manageability and Quality of Service (QoS) must be supported by the home network technology.

In a preferred embodiment, HNG 30 is provided with network management functionality including "device discovery", configuration, and management services and resources management for insuring service quality in the home network. Device discovery can be performed using discovery protocols supported by the home network. This functionality allows HNG 30 to discover the devices present in the home network. Additionally, new devices can use the discovery protocol to join the network and request services through HNG 30. HNG 30 can also use well-defined SNMP and MIB interfaces for configuring and managing the devices in the home network. In the embodiment illustrated in FIG. 3, a device database 62 is maintained in communication with HNG 30 as illustrated in FIG. 3. HNG 30 then utilizes device database 62 to retrieve configuration files and upload the files to a specific device for configuration or other purposes.

In performing service management, HNG 30 controls access to MSO-based services. HNG 30 can obtain from NMS/EMS authorization and authentication information to subscribers to access services or, alternatively, by consulting its service level agreement (SLA) database 64 to see if the service is listed for the home. In this embodiment, SLA database 64 contains the services authorized in the home services by HNG 30 as well as the class of service (e.g., premium, standard or basic) with which the subscriber has signed. The service level agreement is also related to how the network resources are managed by HNG 30. As an example, data services can be delivered using different transmission rates wherein a basic class corresponds to the lower transmission rate and, therefore, also to the limited bandwidth allows for usage by the devices supporting the data services. The service level agreement also determines the QoS guaranteed for each service. In one embodiment, contention for service is resolved using a prioritization scheme based on the service level agreement. As an example, voice service may have priority over data service, which may, in return, be provided prior to distributing video signals in the home network. Alternative prioritization schemes can be used based on the SLA to allocate bandwidth or, in general, resources to devices and services.

Other functionality that can be implemented inside the home networking gateway includes routing and bridging among in-home network-attached devices and service-specific metering for billing purposes. In this embodiment, the home networking gateway communicates with a centralized billing service to control service usage by time, by bytes, or by calls. Additionally, a home networking gateway formed in accordance with the present invention may use tunneling or other well-known protocols to support virtual private network (VPN) technology. In this embodiment, the home networking gateway performs service-specific privacy management, allowing for businesses to extend their network to other locations by securely transmitting the data via the HFC network.

Figure 4:
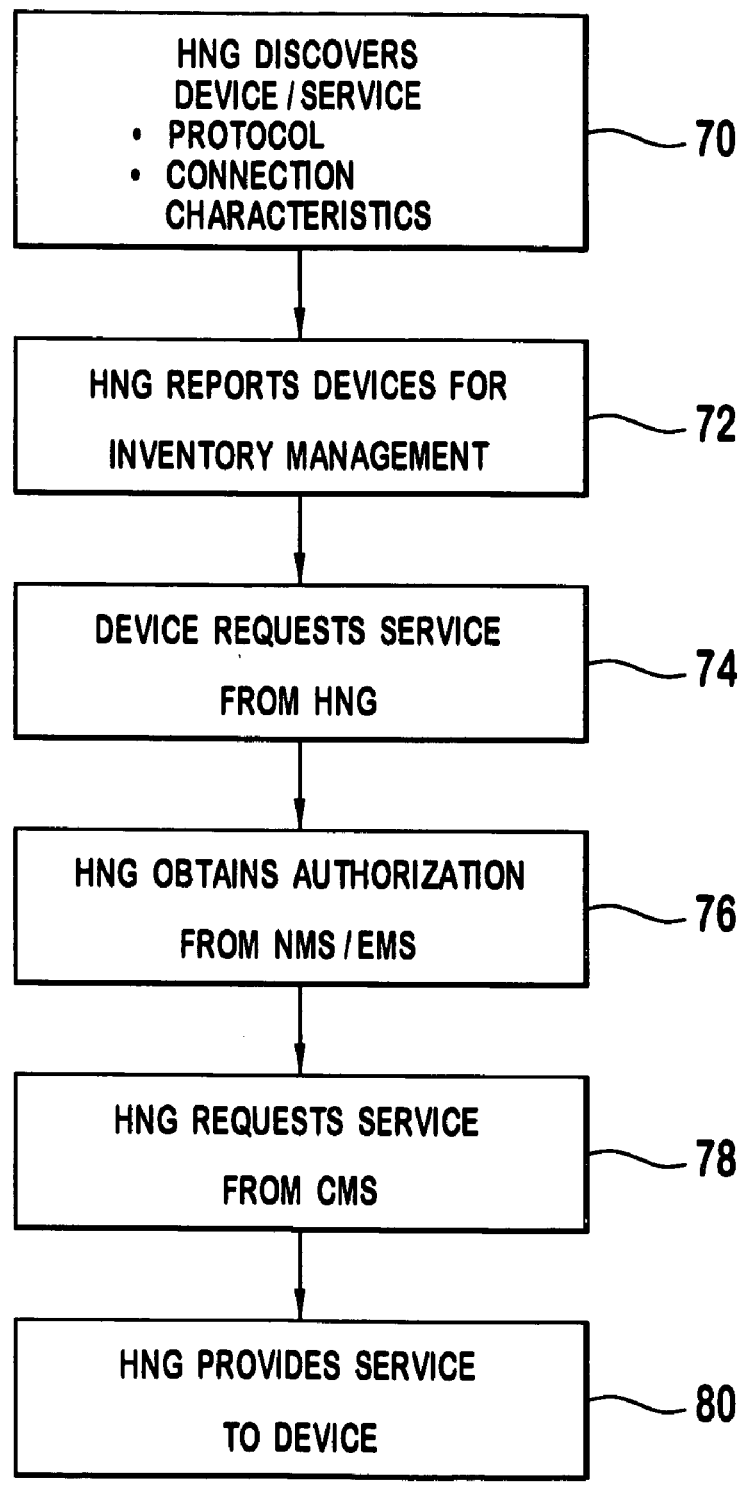
FIG. 4 is a flowchart of an exemplary process used by the inventive HNG to perform device discovery within the in-home network.

As illustrated in FIG. 4, a home networking gateway formed in accordance with the present invention can support the "discovery" of a device connected to the network via an in-home networking protocol (block 70), and can also report the presence of this device to a network/element management system 68 (see FIG. 3), for the purposes of inventory management (block 72, FIG. 4). For example, this may include the ability to determine if the subscriber has paid for and is authorized to receive a particular service. The device may then request a particular service (block 74) from home networking gateway (HUNG) 30, and once HNG 30 has confirmed with NMS/EMS 68 that the device is authorized for that service (block 76), may request that service (block 78) from the Call Management System (CMS) 16. Upon receiving authorization from CMS 16, HNG 30 can provide service to the device (block 80). The service requested may be an MSO-based service such as a voice or video service. In this embodiment, the grant of service implies that resources needed to meet the service level agreement are available for that service in both the home network and the HFC network.

Figure 5:
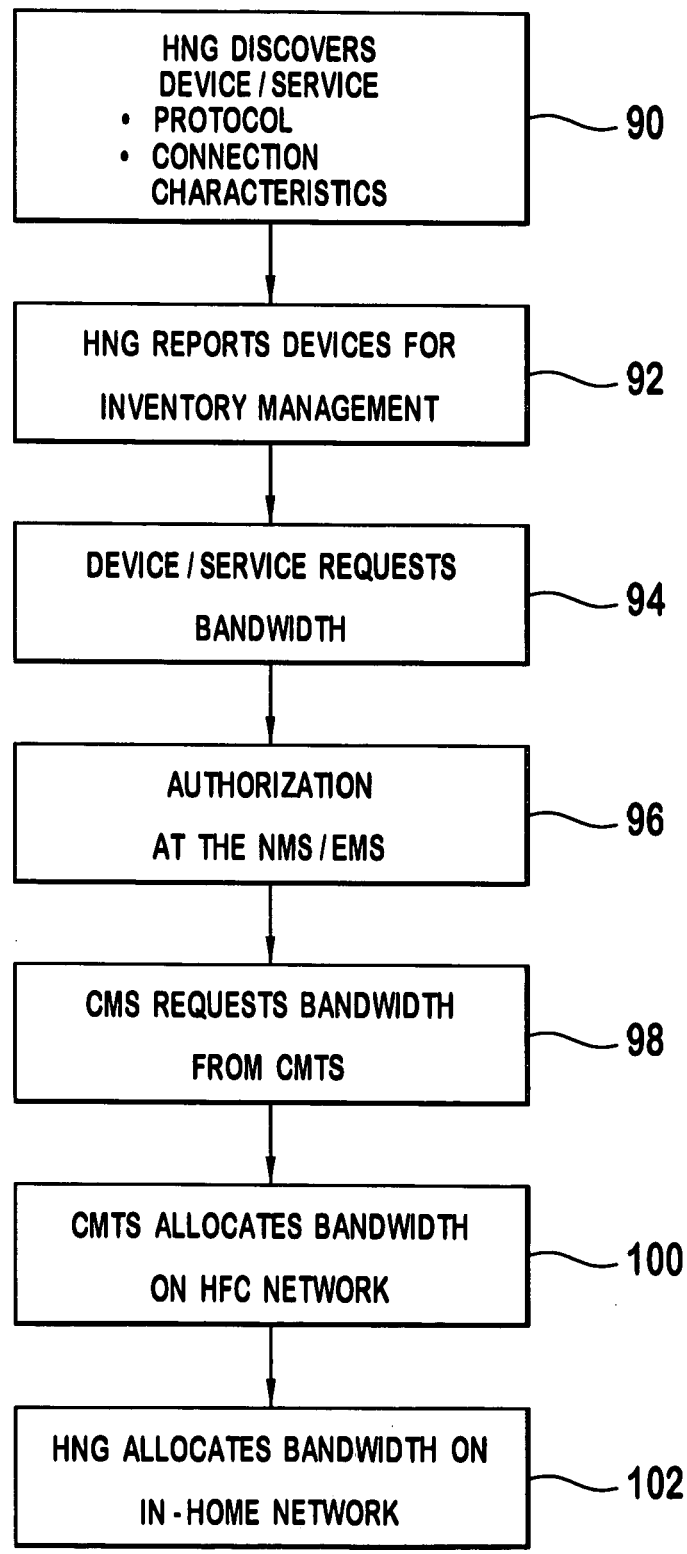
FIG. 5 is a flow chart of an exemplary process used by an HNG to provide bandwidth allocation for connected devices.

FIG. 5 contains a flow chart illustrating the various steps involved in a bandwidth allocation process as administered by a home networking gateway. As with the service authorization process flow discussed above, the bandwidth allocation process starts with) HNG 30 performs a device discovery operation (block 90) to determine the protocol and connection characteristics of each device coupled to the in-home network, reporting these results to NMS/EMS 68

(block 92). In an exemplary arrangement, HNG 30 discovers a device and its service requirements, including the type of flow (i.e., asynchronous Or synchronous) and the bandwidth consumption. In the case of a synchronous flow, such as transmission, bandwidth can be pre-allocated for that device. In this particular example, the device (or service) makes a request for "bandwidth" (block 94). An authorization step is performed at NMS/EMS 68 to determine if this particular device/service may utilize the requested bandwidth (block 96) and upon receiving authorization, the device contacts CMTS 12 for the bandwidth (block 98), where CMTS 12 then allocates the requested bandwidth on the HFC network (block 100). HNG 30 will then, in turn, allocate the requested bandwidth on the in-home network to the requesting device.

Figure 6:
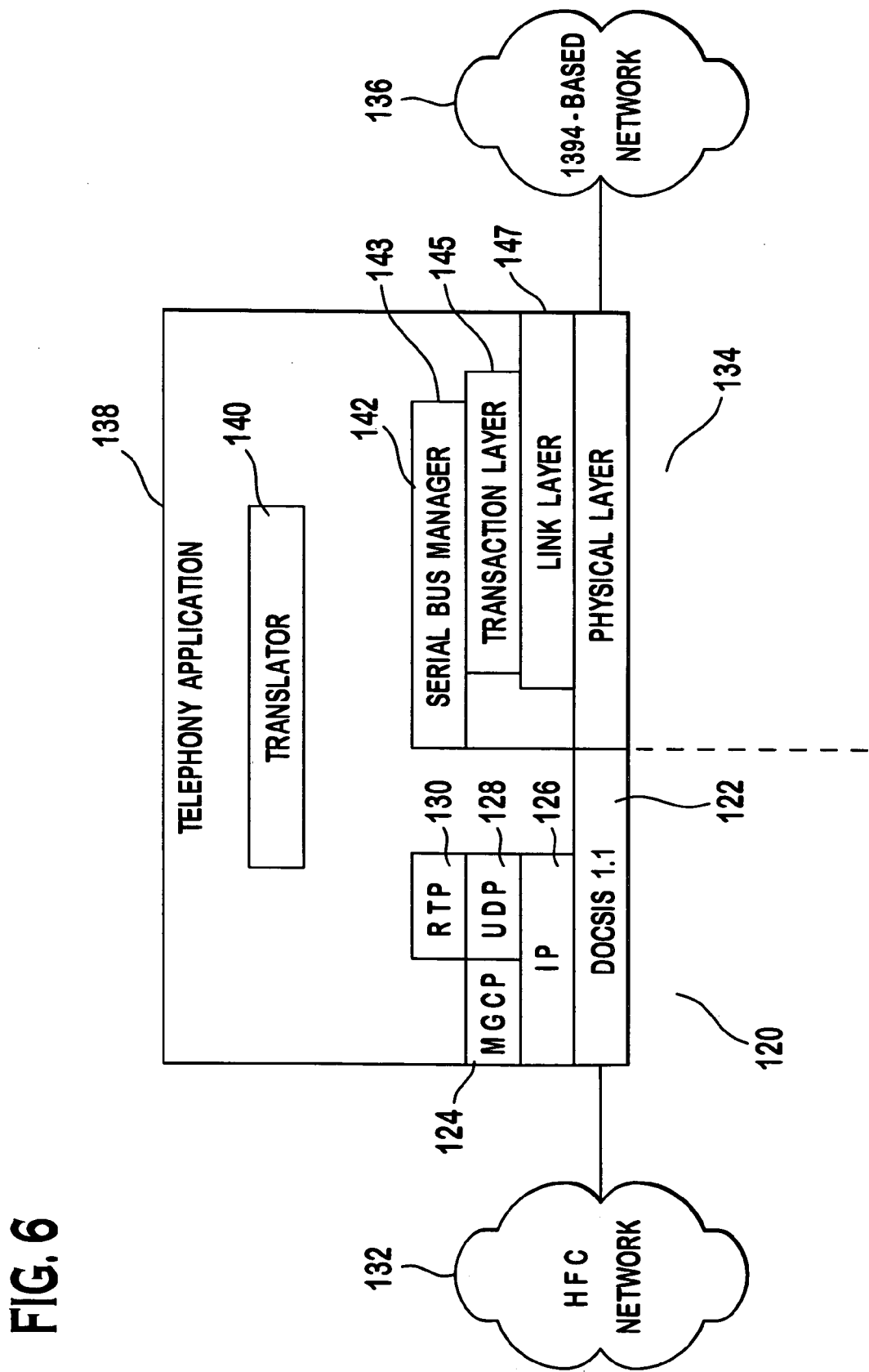
FIG. 6 illustrates an exemplary protocol architecture for an exemplary home networking gateway using an IEEE 1394-based in-home network.

FIG. 6 illustrates the protocol architecture of an IEEE 1394 HNG, in which in the protocol stack on the HFC side, designated 120, uses DOCSIS and MGCP protocols 122, 124 in combination with IP/UDP/RTP protocols 126, 128, 130 to allow for communication over the HFC network 132. The protocol stack on the home network side 134 contains the stacked layers for performing 1394-based operations through a 1394-based network 136 As illustrated in FIG. 6, telephony application 138 receives signaling, voice or DOCSIS packets from HFC network 132 and generates, through a translator function 140, equivalent packets for transmission to a device attached to 1394-based network 136. As an example, a ringing request received from MGCP layer 124 is translated into a 1394 packet pre-configured for ringing the destination device.

A serial bus manager (SBM) 142 provides the basic control functions to control the nodes and to manage the bus resources. A component of SBM 142, defined as the Isochronous Resource Manager (IRM), centralizes the services needed to allocate bandwidth and other isochronous resources including isochronous access to the bus for sending voice packages. The other protocols in the stack on in-home network side 134 (i.e., transaction layer, link layer, physical layer) are described in the IEEE 1394 standard and are also well-known in the art.

Figure 7:
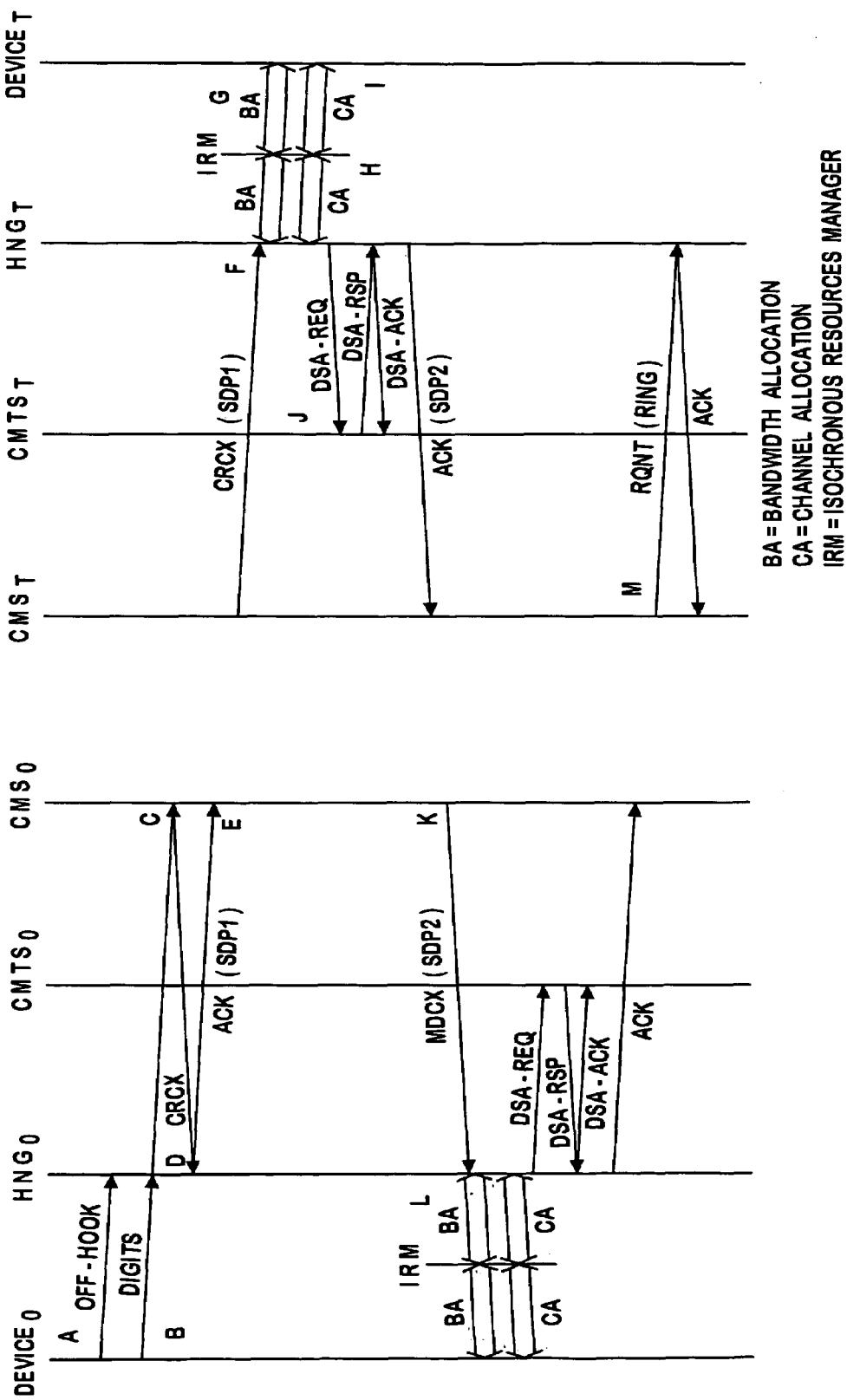
FIG. 7 contains a call flow diagram for establishing voice communication between an HFC network and an IEEE 1394-based (Fire Wire) in-home network.

FIG. 7 illustrates an example of call flow for establishing a voice connection between two devices attached to an IEEE 1394-based in-home network through an HFC network. In particular, the call flow of FIG. 7 depicts a method of extending the QoS provided inside an HFC network into the in-home network by reserving resources in both networks. As shown, call flow starts with a first device (denoted $DEVICE_O$) going off-hook (A). The off-hook state is detected by the home networking gateway attached to $DEVICE_0$ (denoted $HNG_0$), when then receives the digits entered by the device (B). The digits are then sent to the associated call management system ($CMS_O$) (C) which, in return, issues a create-connection (CRCX) request to $HNG_0$ (D). $HNG_O$ acknowledges the connection with a session description protocol (SDP) packet (E) that specifies the client address at which audio data is to be received, the transport protocol, the port identifier and the audio profile. The audio profile defines the transmission format (which can be based on G.711, G.729, or any other accepted audio transmission format). The call flow for establishing a voice call between two clients attached to a cable network is further described in detail in the "PacketCable Network Based Call Signaling Protocol" specification as well as in the "PacketCable Dynamic Quality-of-Service" specification, and is considered well-known in the art.

As further illustrated in FIG. 7, the destination CMS (denoted $CMS_T$) sends a CRCX to the destination $HNG_T$ with the SDP parameters sent by the calling $HNG_O$ (F). In this embodiment, destination $HNG_T$ calculates from the SDP parameters the resources needed for that call and reserves those resources inside the home network. As also illustrated in FIG. 7, destination $HNG_T$ communicates with its isochronous resource manager (IRM) (G) which can be located inside $HNG_T$ to allocate bandwidth for the call being established. A channel allocation process (H) is also performed by destination $HNG_T$ to specify the channel to use for that call. Similarly, the destination device ($DEVICE_T$), performs bandwidth and channel allocation from the IRM (I). In this embodiment, destination $HNG_T$, after reserving resources inside the home network, exchanges messages with the CMTS Dynamic Service Addition (DSA) to reserve resources inside the HFC network (J). Once the resources are reserved on the DOCSIS layer, originating $CMS_O$ sends a modify-connections (MDCX) request to calling $HNG_O$ to reserve resources in the home network. As previously described with respect to destination $HNG_T$ and $DEVICE_T$, $DEVICE_O$ and $HNG_O$ also reserve resources through its IRM, as shown in FIG. 7. Originating $HNG_O$ also reserves resources through the CMTS before a ringing request (RQNT) is sent to destination $HNG_T$ (M).

The call flow illustrated in FIG. 7 shows only the signaling between the in-home network attached device, the HNG, the CMS and the CMTS. It is to be understood that additional signaling, well-known in the art and not shown here, is performed between the originating CMTS and CMS and the destination CMTS and CMS.

Figure 8:
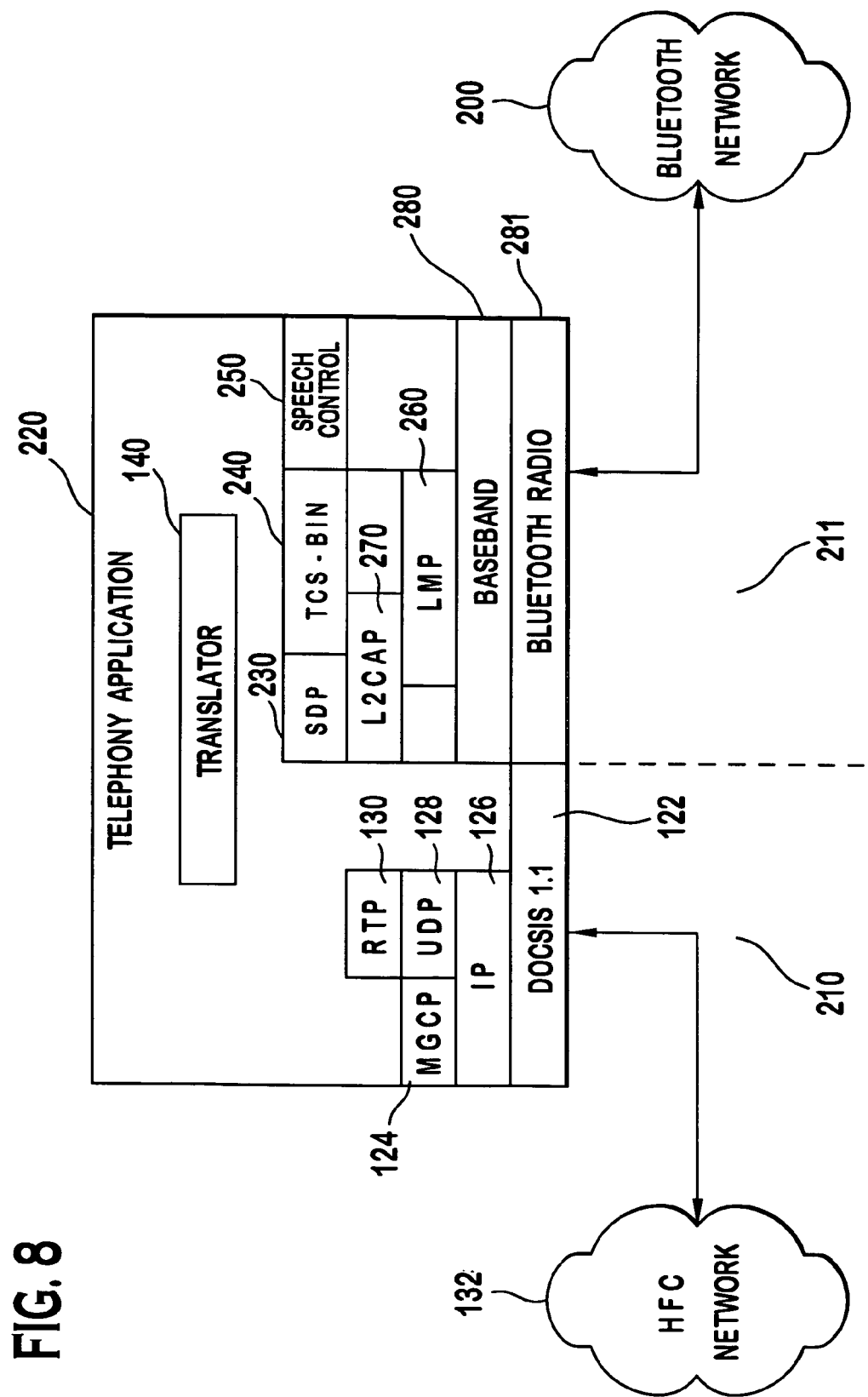
FIG. 8 illustrates an exemplary protocol stack for an HNG interface between an HFC network and a Bluetooth-based in-home network.

FIG. 8 illustrates an alternative protocol stack useful in implementing the home networking gateway of the present invention when used with a "Bluetooth" in-home network 200, where the Bluetooth network is described in detail in a "Bluetooth Version 1.0" specification. As shown, the protocol stack on the HFC network side 210 is essentially identical to that described above in association with FIG. 6. In this case, telephony application 220 utilizes the Bluetooth Service Discovery Protocol (SDP) 230 to determine the services available within Bluetooth network 200. For example, the home networking gateway can use this SDP protocol to discover devices with telephony services capabilities. This functionality of the HNG will be described further below in association with FIG. 10. The Telephony Control Specification-Binary (TCS-BIN) 240 is used by telephony application 210 to set up and control a voice call session. TCS-BIN 240, upon initiating a voice connection, gives control to speech control layer 250, which connects (or disconnects) the speech path. Telephony application 210 also makes use of the link layer through the TCS-BIN and SDP protocols. In particular, the link layer contains two protocols, Link Manager Protocol (LMP) 260 and Logical Link Control and Adaptation protocol (L2CAP) 270. LMP 260 is responsible for link set up between Bluetooth devices, including security aspects such as authentication and encryption, as well as for controlling the connection states of the Bluetooth devices. L2CAP 270 adapts the upper layer protocols over the baseband 280. It also provides protocol multiplexing capability, segmentation and re-assembly operations to the upper layer protocols.

Figure 9:
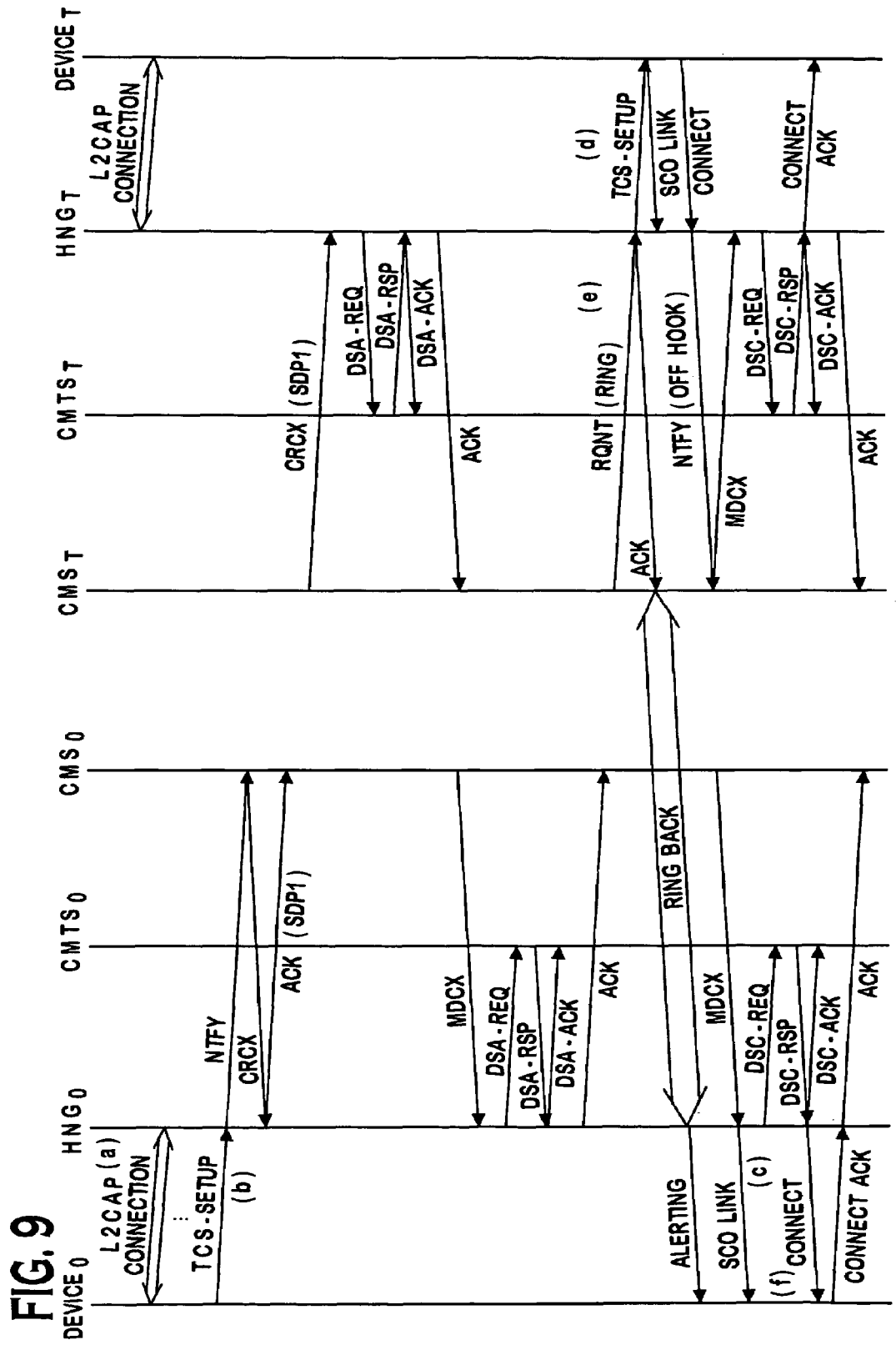
FIG. 9 contains a call flow diagram for establishing a voice connection between two Bluetooth devices through an HFC network.

FIG. 9 illustrates an exemplary call flow for establishing a voice call session between two Bluetooth devices through the HFC network with support of QoS in both networks. In a preferred embodiment, $DEVICE_O$ establishes a L2CAP connection (a) with its $HNG_O$ whenever it comes into range to avoid lengthy call set-up due to the paging procedure. $DEVICE_0$ sends a TCS-SETUP message (b) to $HNG_O$ to initiate a call. The TCS-SETUP message contains various information, including the call class that specifies if the call is destined for an external network, the bearer capability, the calling party and the called party numbers. The bearer capability information indicates which bearer channel is to be used during the call. For a voice call, a synchronous connection-oriented (SCO) bearer channel is indicated and an SCO link (c) with the indicated packet type and voice coding will be used in the speech path set up by speech control protocol 250. Originating $HNG_O$, upon receiving a TCS-SETUP from $DEVICE_O$, establishes a MGCP/DQOS call setup as described above in association with FIG. 7. Destination $HNG_T$ then sends a TCS-SETUP message (d) to the called Bluetooth device ($DEVICE_T$), following a ringing request (e) received from $CMS_T$. As shown in FIG. 9, the SCO link is established before accepting the call, using a CONNECT message sent to destination $HNG_T$ by the called Bluetooth $DEVICE_O$. At the originating side, a SCO link is also established by $HNG_O$ prior to accepting the call. As previously described, in establishing the SCO link, the HNG or Bluetooth telephone device commits to use the parameters indicated in the bearer capability element of the TCS-SETUP message.

FIG. 10 contains a flowchart for "discovering" Bluetooth devices attached to a home networking gateway in accordance with the present invention. In particular, the HNG searches for Bluetooth devices that are in range through a Bluetooth inquiry process (step 300), and then establishes a link (step 310) with each of the discovered devices. The HNG then uses the SDP protocol (step 320) to find devices having telephony service capability and stores the address of each device (step 330) in a local storage medium. The results can also be transmitted (step 340) to an element management system (EMS) for inventory purposes.

The foregoing merely illustrates various embodiments of the present invention. Those skilled in the art will be able to devise numerous arrangements which, although not explicitly shown or described herein, embody the principles of the invention and are within the spirit and scope thereof.

What is claimed is:

1. An arrangement for providing a communication interface between a hybrid fiber coaxial (HFC) network and an in-home communications network, the arrangement comprising:
    a home networking gateway disposed to communicate with the HFC network and couple communications to the in-home network, the home networking gateway including a translator for mapping between HFC-based communication protocols and in-home network-based protocols wherein the home networking gateway further comprises;
        a home network interface connection module for supporting a pre-defined in-home communication protocol;
        a voice telephony service connection module, coupled to the home network interface connection module, for providing communication with in-home telephony devices;
        a data service connection module for providing communication with in-home data-based devices;
        a cable modem connection module for providing communication with the HFC network;
        a communication bus coupled to each of the voice telephone service connection module, the data service connection module and the cable modem connection module for enabling communication between each module; and
        a translator processor coupled to the communication bus for mapping between communication protocols used by the HFC network and protocols used by the in-home network and providing translated protocols with each transaction;
    a device database coupled to said home networking gateway and comprising configuration files associated with various in-home telecommunications devices; and
    a service level agreement database coupled to said home networking gateway and comprising a listing of authorized services for the in-home network, class of service information and quality of service information.

2. The arrangement as defined in claim 1 wherein the voice telephony service connection module comprises a subscriber line interface circuit (SLIC) connection.

3. The arrangement as defined in claim 1 wherein the data service connection module comprises an Ethernet connection.

4. The arrangement as defined in claim 1 wherein the in-home network protocol is a wireless service protocol.

5. The arrangement as defined in claim 4 wherein the wireless protocol comprises the Shared Wireless Access Protocol (SWAP).

6. The arrangement as defined in claim 1 wherein the in-home network protocol comprises the Home Phoneline Network Alliance (HomePNA) protocol.

7. The arrangement as defined in claim 1 wherein the in-home network protocol comprises the IEEE 1394 FireWire protocol.

8. The arrangement as defined in claim 1 wherein the home networking gateway further comprises an internal battery power supply.

9. The arrangement as defined by claim 1 wherein the home networking gateway further comprises a digital signal processor (DSP) coupled between the voice connection module and the home network interface module to distribute voice signals from said voice communication module into the in-home network through said home network interface module.

10. A method of providing network management for an in-home network of communication devices coupled to an external HFC network through a home networking gateway, the method comprising:
    recognizing at the home networking gateway a service request from an in-home network device;
    obtaining authorization for said service from a network management system;
    upon authorization, requesting said service from a call management system;
    providing said service to the in-home device;
    recognizing at the home networking gateway a device request for bandwidth;
    obtaining authorization bandwidth from a network management system;
    upon authorization, requesting bandwidth from a cable modem termination system (CMTS);
    allocating the requested bandwidth on the HFC network; and
    allocating, through the home networking gateway, the requested bandwidth on the in-home network to the requesting device.

* * * * *